United States Patent
Kandlbinder et al.

(10) Patent No.: US 6,247,260 B1
(45) Date of Patent: Jun. 19, 2001

(54) FISH BAIT PROTECTOR

(76) Inventors: Arnold Kandlbinder; Theola Kandlbinder, both of 792 Sulton La., Union, MO (US) 63084

(*) Notice: Subject to any disclaimer, the term of this patent is extended or adjusted under 35 U.S.C. 154(b) by 0 days.

(21) Appl. No.: 09/503,963

(22) Filed: Feb. 14, 2000

(51) Int. Cl.⁷ ............................. A01K 97/04; A01K 85/01
(52) U.S. Cl. ................................................... 43/41; 43/44.4
(58) Field of Search ........................... 43/41, 42.06, 44.2, 43/44.4, 44.9; 383/117, 76

(56) References Cited

U.S. PATENT DOCUMENTS

| | | | |
|---|---|---|---|
| 856,867 | * | 6/1907 | Hayward ................................... 43/41 |
| 1,084,584 | * | 1/1914 | Moody ................................. 383/117 |
| 2,390,423 | * | 12/1945 | Carter ..................................... 383/76 |
| 2,555,088 | * | 5/1951 | Irwin ........................................ 43/41 |
| 2,828,571 | * | 4/1958 | Caplan ..................................... 43/41 |
| 3,273,277 | * | 9/1966 | Valentine ................................. 43/41 |
| 3,908,298 | | 9/1975 | Strader ................................ 43/42.05 |
| 4,388,739 | * | 6/1983 | Martinon et al. ..................... 383/117 |
| 4,563,832 | * | 1/1986 | Drebot ................................ 43/44.99 |
| 4,839,982 | * | 6/1989 | Wood ........................................ 43/41 |
| 4,961,280 | | 10/1990 | Hudson ................................ 43/44.99 |
| 5,131,183 | | 7/1992 | Thayer et al. ....................... 43/43.11 |
| 5,319,875 | * | 6/1994 | Brandolino .......................... 43/42.06 |
| 5,943,810 | | 8/1999 | Bennett et al. ........................... 43/41 |

FOREIGN PATENT DOCUMENTS

2331689 * 6/1999 (GB).
WO 86/06251 * 11/1986 (WO).

* cited by examiner

Primary Examiner—Darren W. Ark
(74) Attorney, Agent, or Firm—Polsinelli Shalton & Welte, P.C.

(57) ABSTRACT

The present invention relates to a fish bait protector which is a mesh, tubular structure having an open end and a closed end, with the open end having a member for closing the open end located proximal to the open end so that the member can open and close the open end. The fish bait protector will slip over a baited hook and close, thereby holding the bait in proximity to the hook.

5 Claims, 1 Drawing Sheet

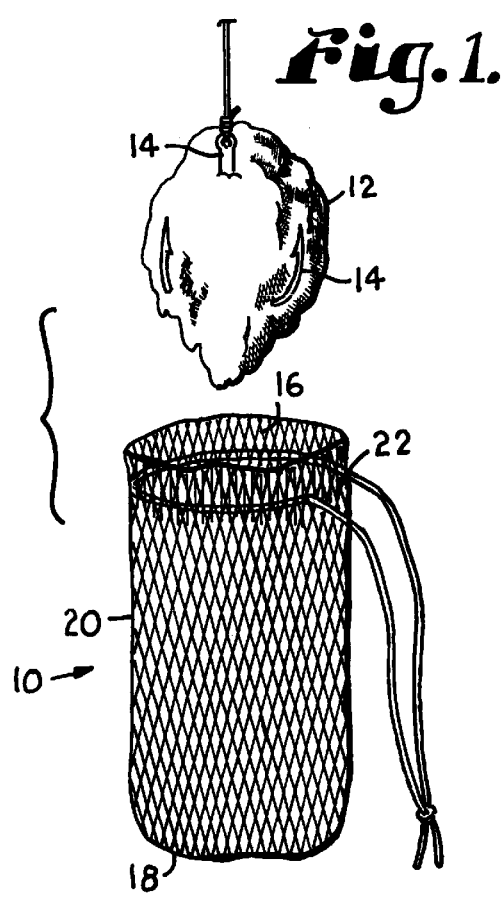
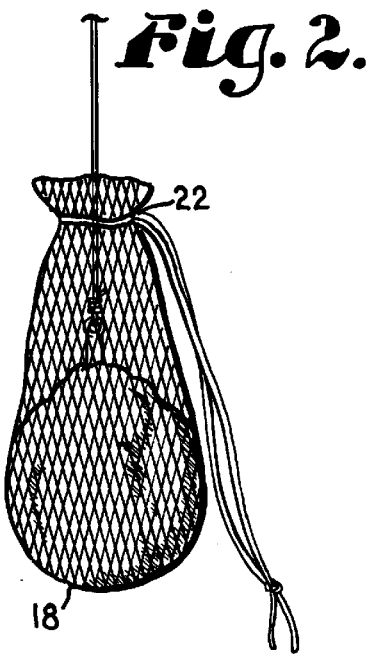
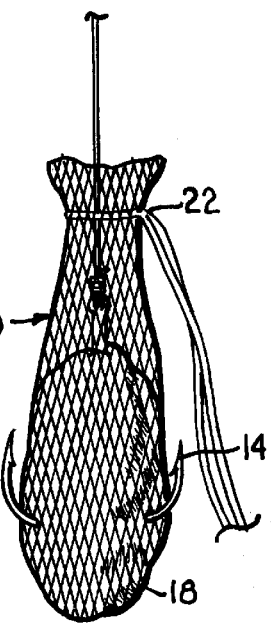
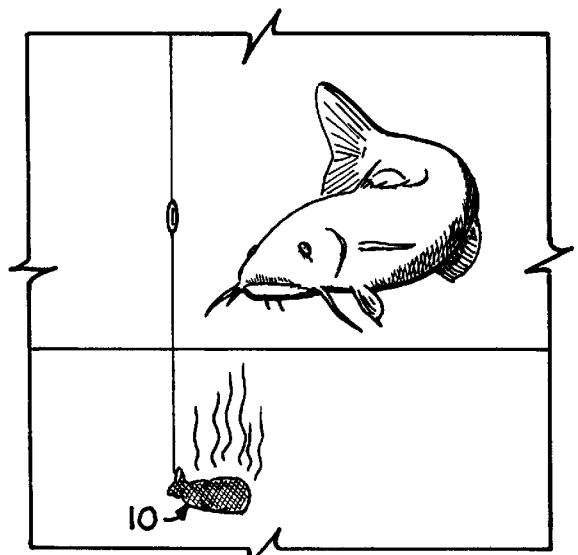
Fig. 1.
Fig. 2.
Fig. 3.
Fig. 4.

FISH BAIT PROTECTOR

FIELD OF INVENTION

The present invention relates to a device for use in protecting fish bait from degradation as a result of casting and recasting the bait or as a consequence of nibbling by small fish. More particularly, the present invention relates to a mesh bag or tube, having an open end, which fits over and around bait used to catch fish, thereby substantially eliminating degradation of such bait.

BACKGROUND OF INVENTION

Fishing is an activity that is growing increasingly more popular. As the sport of fishing becomes more popular, the market for devices and tools which allow for improved catch rates grows. Fishing for catfish is unlike fishing for most other types of fish. Catfish tend to be bottom dwellers, meaning that they spend the majority of their time at or near the bottom of a pond or river. These fish feed by smell, as opposed to sight. What this means is that a person fishing for catfish must use a bait that imparts a strong smell or odiforous scent to the water. A strong smelling bait will attract the catfish and allow the person fishing to entice the fish to strike the bait held by the hook. Among desired types of baits are liver, cheese, gizzards, rotten shrimp, or any other bait that emits a strong odor.

As is well known, when fishing, it is often required to continually cast and recast the bait. This is done because the fish are not biting in a particular location of a pond, and the person fishing is trying to locate the bait in a position proximal to where the fish are residing. Repeated casting results in the degradation of the bait. This is because the bait is subjected to the force of casting and is wet. The baits mentioned above are not readily resistant to such forces and conditions. Thus, these types of baits tend to break down and fall off the hook with repeated casting.

A further problem associated with the use of such baits relates to a trot line. This type of fishing involves placing a baited hook into the water for long periods of time, with the baited hook attached to a fishing line, which is then fixedly held by, or tied to, a branch or other object, around which the line can be secured. The trot line then remains in the water for extended periods of time, with the hope that a fish will take the bait and be held by the hook until such time as the person who set out the line returns to check the line. Extended submersion in the water will often cause the bait to degrade and, again, fall off the hook. For these reasons, it is desired to have a device designed to prevent the bait from readily separating from the hook. At the very least, it is desired to have a device that holds the bait in proximity to the hook. As such, it is important to have a device which allows the bait to be held on or near the hook so that when a fish takes the bait, the hook will be set.

Another problem associated with bait used in catfishing relates to small fish nibbling and feeding on the bait. Minnows, or small fish, will slowly eat the bait so that after a period of time, the bait is removed from the hook as a result of being eaten, or very little remains in contact with the hook. This means that the person fishing must continually replace the bait, because minnows and small fish are eating it. As such, it is desired to further have a device which eliminates or substantially prevents smaller fish from eating the bait.

There have been a number of devices designed to protect and maintain the integrity of the bait. For example, it has been known to take strips of nylon from hosiery and wrap such nylon around fishing bait to protect the integrity of the fishing bait. This, however, has a number of problems. First, the hosiery does not allow for the ready dispersion of the odors from the bait into the water. This eliminates hosiery from use by most people who fish. Also, the hosiery is made of nylon, which tends to curl and fray, and is difficult to handle. Thus, the use of hosiery has a number of disadvantages.

It has also been known to use mantels from a lantern to protect the bait. These devices suffer from being comparatively expensive and lacking the necessary integrity for repeated use. More particularly, the mantels cannot be used repeatedly because they degrade with time.

Other devices that have been used are typically integrally attached to a fishing line or hook, which results in a more difficult device to use. It is preferred if the device used for protecting the integrity of the bait can be readily slipped on and off the bait, with little effort. It is also preferred if the device is separate from the fishing line or hook, as each fisherman has his or her preference of hooks and fishing line gauge. Also, a removable, non-integral device is preferred because it will allow for the person fishing to reuse the device once a fish has been caught. Often, the fish bends the hook or damages the line so that it must be replaced, which, in turn, results in a preference for a separable device.

For the reasons stated, it is preferred to have a device that is separable from the fishing line and hook, inexpensive to use, and capable of reuse. More importantly, it is preferred to have a device that protects the integrity of bait that is repeatedly cast or left in water for an extended time. It is also preferred if such device prevents or inhibits feeding on such bait by smaller fish, which is not desired by the person fishing.

SUMMARY OF INVENTION

The present invention relates to a fish bait protector designed to protect bait on or located near a hook from being nibbled on by small fish, or readily separating from the hook as a result of repeated casting. The fish bait protector is of a mesh material that is non-integral and removably attached to the fishing line and hook. Additionally, the bait protector is waterproof and can be used repeatedly. Essentially, the fish bait protector is a bag member having an open end, and made of mesh, whereby a baited hook can be located within the interior of the bag member. After a baited hook is located within the interior of the bait protector, the open end can be closed so as to hold the bait within the bait protector and prevent the bait protector from slipping off and away from the hook. As such, the bait protector can be summarized as a mesh bag member having an open end that can be open and closed.

The present invention also relates to a method for protecting bait from small fish and maintaining the bait in proximity to the hook. The method simply involves baiting the hook and then placing the bait protector over and around the baited hook. Alternatively, live bait can be located near the hook, with the protector placed around the live bait, thereby assuring that the bait is located near the hook. Once the bait is located within the bait protector, the open end is closed, and the bait is ready to be cast into the water.

The present invention is advantageous because it can be used repeatedly to provide a fisherman with a device that readily protects the integrity of the bait. The present invention is also advantageous because it is non-integral and removably attached to the fishing line and hook, which means the person fishing can select any of a variety of line gauges and hook sizes to suit the person's particular needs. As such, the present invention is desired because it is comparatively inexpensive, can be re-used, is easy to use, and readily protects the bait.

BRIEF DESCRIPTION OF DRAWINGS

FIG. 1 is a perspective view of a fish bait protector in an open position prior to the placement of a baited hook into the protector;

FIG. 2 is a perspective view of the fish bait protector having the bait located therein, with the open end closed around the bait;

FIG. 3 is a perspective view showing a baited hook in the fish bait protector, with the barbs of the hook protruding through the fish bait protector; and, FIG. 4 is a perspective view showing the fish bait protector in use.

DETAILED DESCRIPTION OF INVENTION

The present invention relates to a bait protector 10, shown in FIG. 1, and a method of protecting bait. The bait protector 10 is designed to protect the integrity of bait 12 attached to or held by a hook 14. The bait protector 10 slips over and around the bait 12 after it has been affixed to a hook 14. Once the bait protector 10 is slipped over the bait 12, an open end 16 of the bait protector 10 is closed, thereby fixedly holding the bait protector around the bait 12, as shown in FIGS. 2, 3 and 4. Importantly, when in use, the bait protector substantially prevents nibbling by small fish and helps hold the bait in proximity to the hook, even after repeated casting of the bait.

The bait protector 10 shown in FIG. 1 is a tubular bag member, sealed at one end 18 and open at the opposite end 16, to form a device that is a bag or tube 20 having one open end 16. Located proximal to the open end 16 is a member for closing the protector. The member is preferably removably attached to the bag member 20. It is preferred if the member is a string 22; however, it can be any device that can reduce the diameter of the open end once the bait is located within the protector. Because the bag member is preferably made of mesh, it is preferred if the string 22 is integral with the mesh. The string can be attached in other ways, as long as the protector 10 can be closed or the diameter of the open end 16 reduced to contain the bait 12. The string 22 can be made from any of a variety of materials, as long as it is waterproof and can be tied in a knot. The string is preferably waterproof or water-resistant. Also, the string should be of a sufficient length to cause a knot to be easily tied once the protector has been slipped over the bait. A clip, or similar device, can instead be used to tighten the string instead of having a length of string sufficient to form a knot. An alternative embodiment includes an elastic material that fits around the open end 16 and can be expanded and contracted so as to open and close the open end.

The bag member 20, which forms the protector, is made from a mesh material. The mesh material can be of a variety of different gauge sizes, with any gauge size available for use that prevents minnows or small fish from nibbling at the bait and will still hold the bait in the protector 10. The mesh size should be such that each hole has a diameter equal to between about 2.5 millimeters (mm) and about 10 mm. Preferably, the mesh will have a circumference ranging between about 1.5 mm and 25 mm. More preferably, the mesh will have a diameter of 5 mm and a circumference of 6.25 mm. The mesh material will preferably be made from a pliable, waterproof or water-resistant, plastic material. Most importantly, the mesh material should not hinder the dissipation of odors into the water. It is preferred to take tubular mesh material, seal it at one end 16, and then pass the member for closing, preferably string 22, through the mesh material at the opposite end. Also, it is preferred if the mesh material has a density equal to or less than 1 g/cm$^3$, as this allows the mesh to float in water.

Another way to describe the mesh size of the bait sock is to describe the gauge size of the webbing material. In the present invention, it is preferred if the bait sock has a gauge size ranging between 0.12 and 0.30, with the preferred gauge sizes being either 0.12, 0.22, or 0.30.

The bag member 20 that forms the bait protector 10 can be any of a variety of lengths and widths, dependent upon the size of the bait 12 around which the protector 10 is going to be slipped. As the size of the bait increases, the length and width of the bait protector 10 should also increase. It is preferred if the bait protector 10 has a length ranging between about 2 inches and about 12 inches, and a width ranging between about 0.75 inches and about 6 inches. More preferably, the bait protector 10 has a length ranging between about 2 inches and about 5 inches, and a width ranging between about 0.75 inches and about 1.5 inches.

The bait protector works by first baiting a hook with the bait 12 or placing bait proximal to the hook 14. The bait protector 10 is then slipped over the bait by first passing the open end 16 over the bait 12. Once the bait is inside the protector 10, the member for closing 22 is actuated to close the open end 16. The bait is now encased in or held by the protector and is ready to be cast into the water. The protector in use is shown in FIG. 4.

Thus, there has been shown a and described a novel product associated with protecting fishing bait, which fulfills all of the objects and advantages sought therefor. It will be apparent to those skilled in the art, however, that many changes, variations, modifications, and other uses and applications for the subject product are possible, and also changes, variations, modifications, and other uses and applications which do not depart from the spirit and scope of the invention are deemed to be covered by the invention which is limited only by the claims which follow.

What is claimed is:

1. A fish bait protector for protecting the integrity of bait held by or located proximal to a hook attached to a fishing line, whereby said protector is freestanding and independent of the fishing line, with said protector designed and dimensioned to be fitted around the hook, said protector consisting of:

a generally cylindrical mesh bag member open at one end and closed at an end opposite said open end so that said protector can be slipped over the bait and the hook, with said bait located within said protector, wherein said mesh bag member comprises mesh with a gauge size ranging between 0.12 and 0.30, said mesh also having a density equal to or less than 1 g/cm$^3$; and a member for closing said open end, said member for closing located proximal to said open end, thereby securing said protector around the bait, wherein said member for closing is a string member of a length sufficient to equal a diameter of said open end and can be pulled to reduce the diameter of said open end.

2. The fish bait protector of claim 1 wherein said mesh bag member has a length ranging between about 2 inches and about 12 inches, and a width ranging between about 0.75 inches and about 6 inches.

3. The fish bait protector of claim 2 wherein said mesh bag member has said length ranging between about 2 inches and about 5 inches, and said width ranging between about 0.75 inches and about 1.5 inches.

4. The fish bait protector of claim 1 wherein said mesh is water-resistant, pliable, and allows for dissipation of odors associated with the bait.

5. A method for protecting bait on or located proximal to a hook from being eaten by small fish or readily falling off the hook as a result of casting, comprising:

pulling a freestanding, generally cylindrical fish bait protector that is independent of a fishing line, with said protector having an open end and a closed end, over a baited hook attached to a fishing line, open end first, so that the baited hook is then located within said fish bait protector, wherein said mesh bag member comprises mesh with a gauge size ranging between 0.12 and 0.30, said mesh also has a density equal to or less than 1 $g/cm^3$; and actuating a closing member located proximal to said open end of said fish bait protector so as to close said fish bait protector around the baited hook, wherein said closing member is a string member of a length sufficient to equal a diameter of said open end and can be pulled to reduce the diameter of said open end.

\* \* \* \* \*